P. J. WIXEY.
MACHINE FOR MAKING DOUGHNUTS, &c.
APPLICATION FILED MAR. 6, 1917.

1,265,854.

Patented May 14, 1918.
7 SHEETS—SHEET 1.

INVENTOR.
P. J. WIXEY
BY John A. Bommhardt
ATTORNEY.

P. J. WIXEY.
MACHINE FOR MAKING DOUGHNUTS, &c.
APPLICATION FILED MAR. 6, 1917.

1,265,854.

Patented May 14, 1918.
7 SHEETS—SHEET 4.

INVENTOR.
P. J. WIXEY
BY John A. Bomhardt
ATTORNEY.

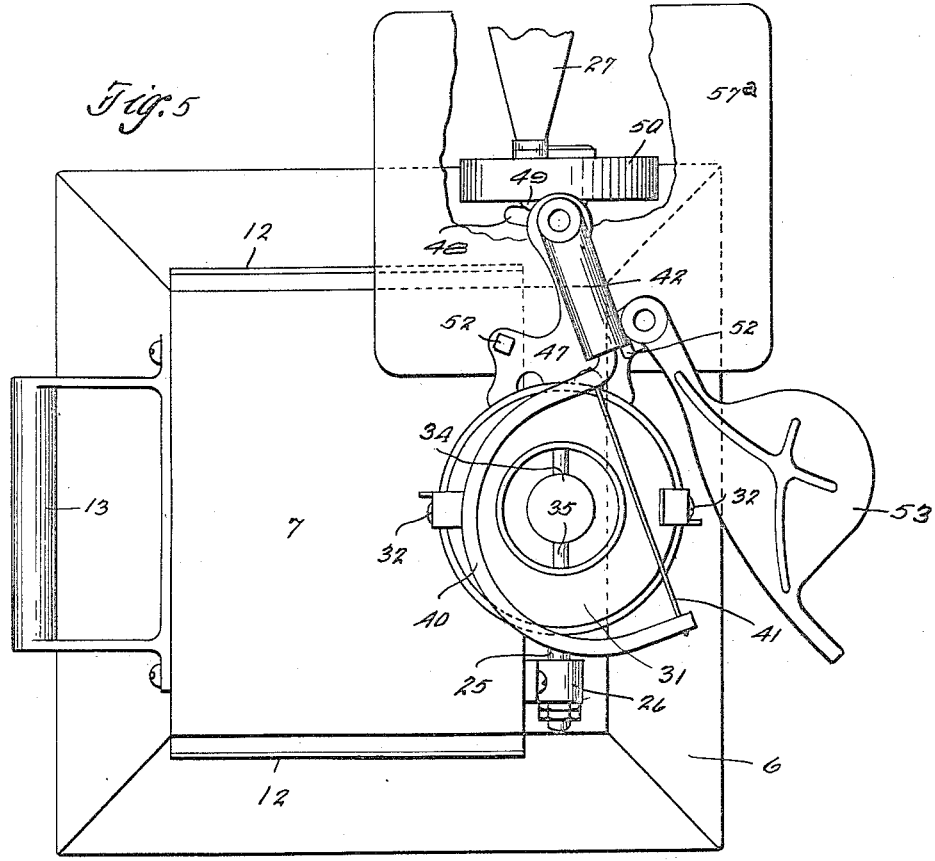
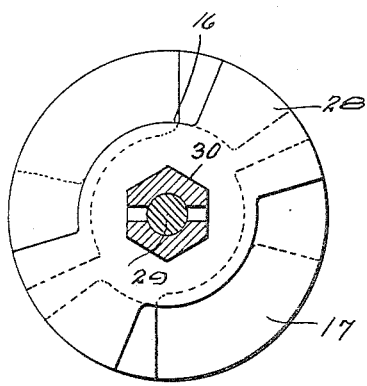
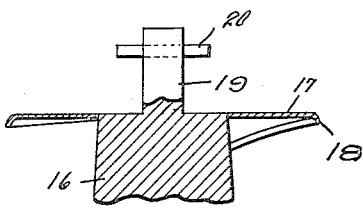

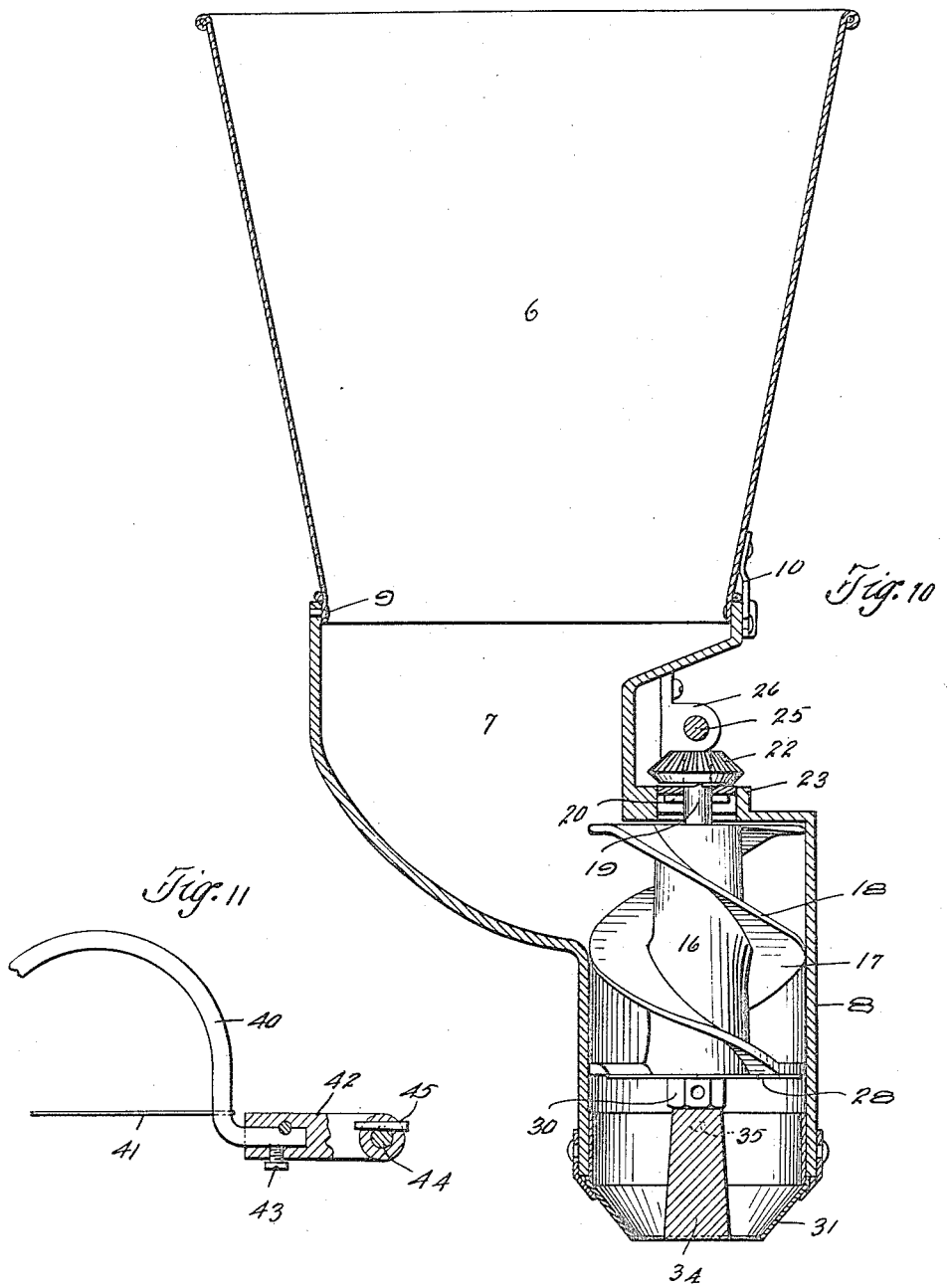

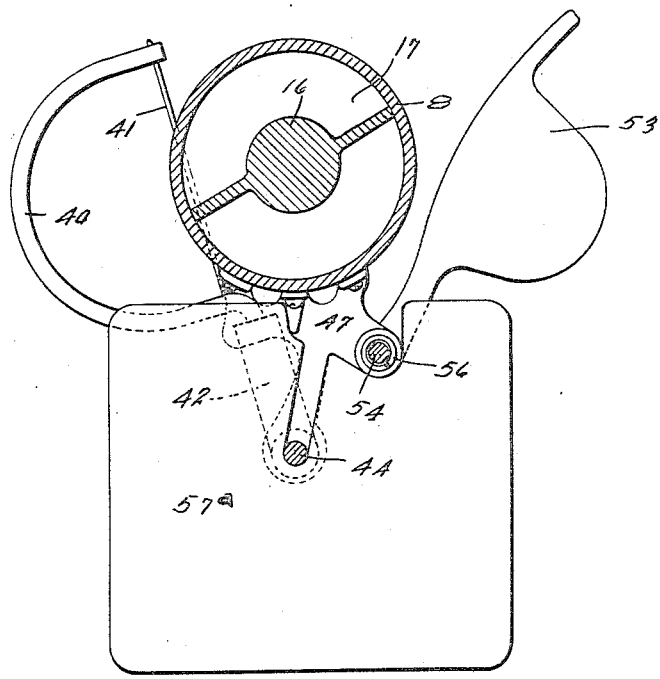
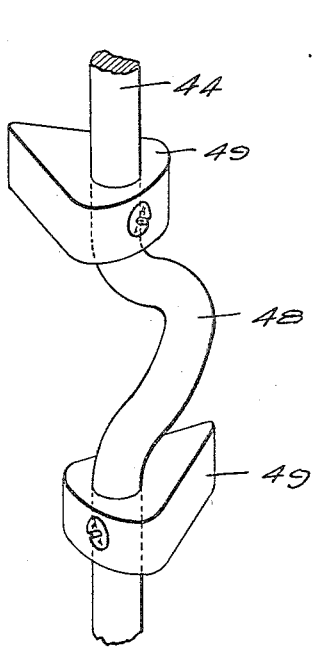
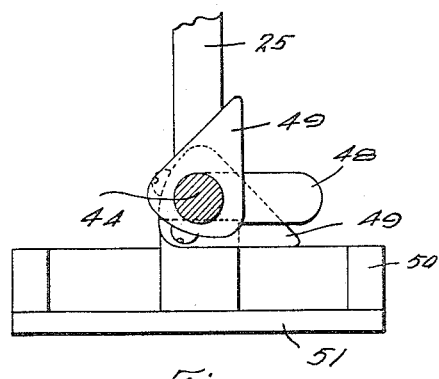

UNITED STATES PATENT OFFICE.

PERCY J. WIXEY, OF CLEVELAND, OHIO, ASSIGNOR OF ONE-HALF TO GEORGE W. HEENE, OF CLEVELAND, OHIO.

MACHINE FOR MAKING DOUGHNUTS, &c.

1,265,854.          Specification of Letters Patent.          Patented May 14, 1918.

Application filed March 6, 1917. Serial No. 152,790.

*To all whom it may concern:*

Be it known that I, PERCY J. WIXEY, a citizen of the United States, residing at Cleveland, in the county of Cuyahoga and State of Ohio, have invented certain new and useful Improvements in Machines for Making Doughnuts, &c., of which the following is a specification.

This invention relates to machines for making doughnuts or the like. It comprises a hopper in which the dough is placed, a spout leading from the hopper to an expressing chamber, a screw device in said chamber for forcing out the dough in tubular form, and a cutter for cutting off the rings of dough to form the doughnuts. The machine is so supported that it can be moved to various positions, above a frying pan or tank, so that the doughnuts will be dropped at different places therein, as they are cut off. In addition to the general features thus referred to, the machine contains a number of improvements in the details, as will be more fully apparent from the following description and the accompanying drawings.

In the drawings—

Fig. 5 is a similar view with the cutter in another position.

Fig. 8 is a bottom view of a measuring device for controlling the feed of the dough.

Fig. 9 is a detail of the screw.

Fig. 10 is a vertical section showing the feeding screw.

Fig. 11 is a detail of the cutter.

Fig. 12 is a horizontal section through the expressing cylinder and associated parts.

Fig. 13 is a detail of the device for oscillating the cutter.

Fig. 14 is a top view of the same.

Figure 1:
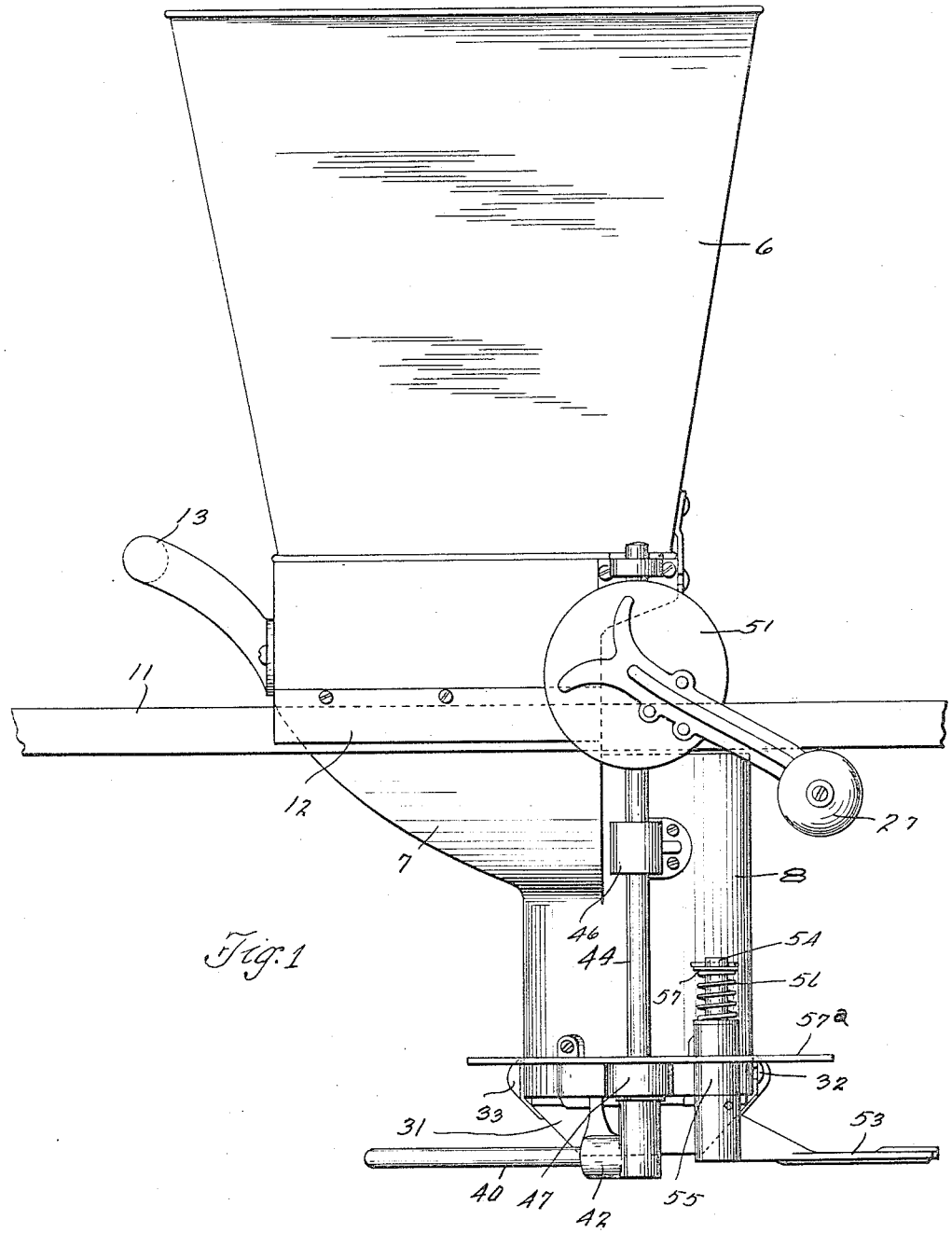
Figure 1 is a side elevation of the machine.
Figure 2:
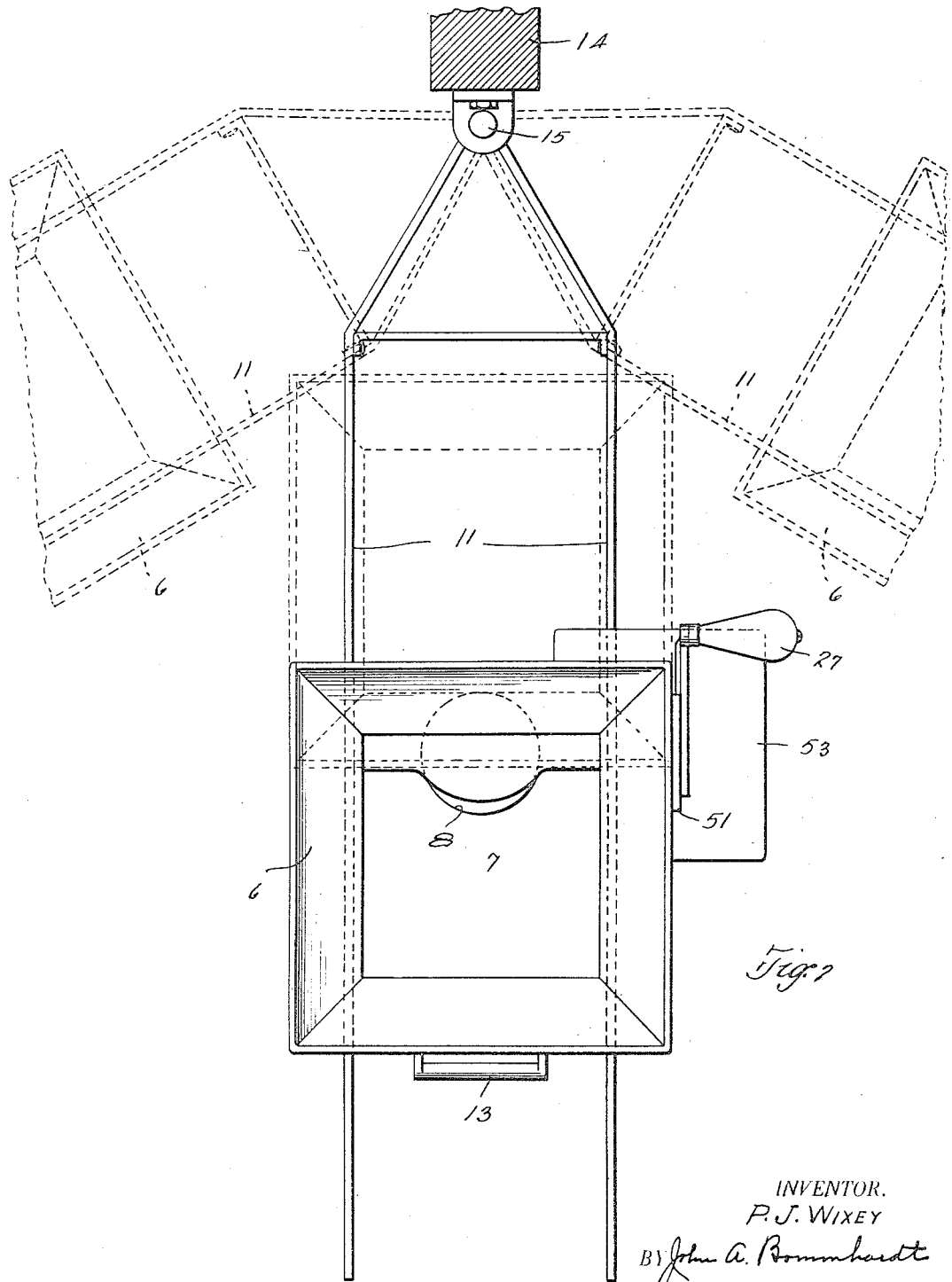
Fig. 2 is a top plan view thereof, showing the swinging support for the same.
Figure 3:
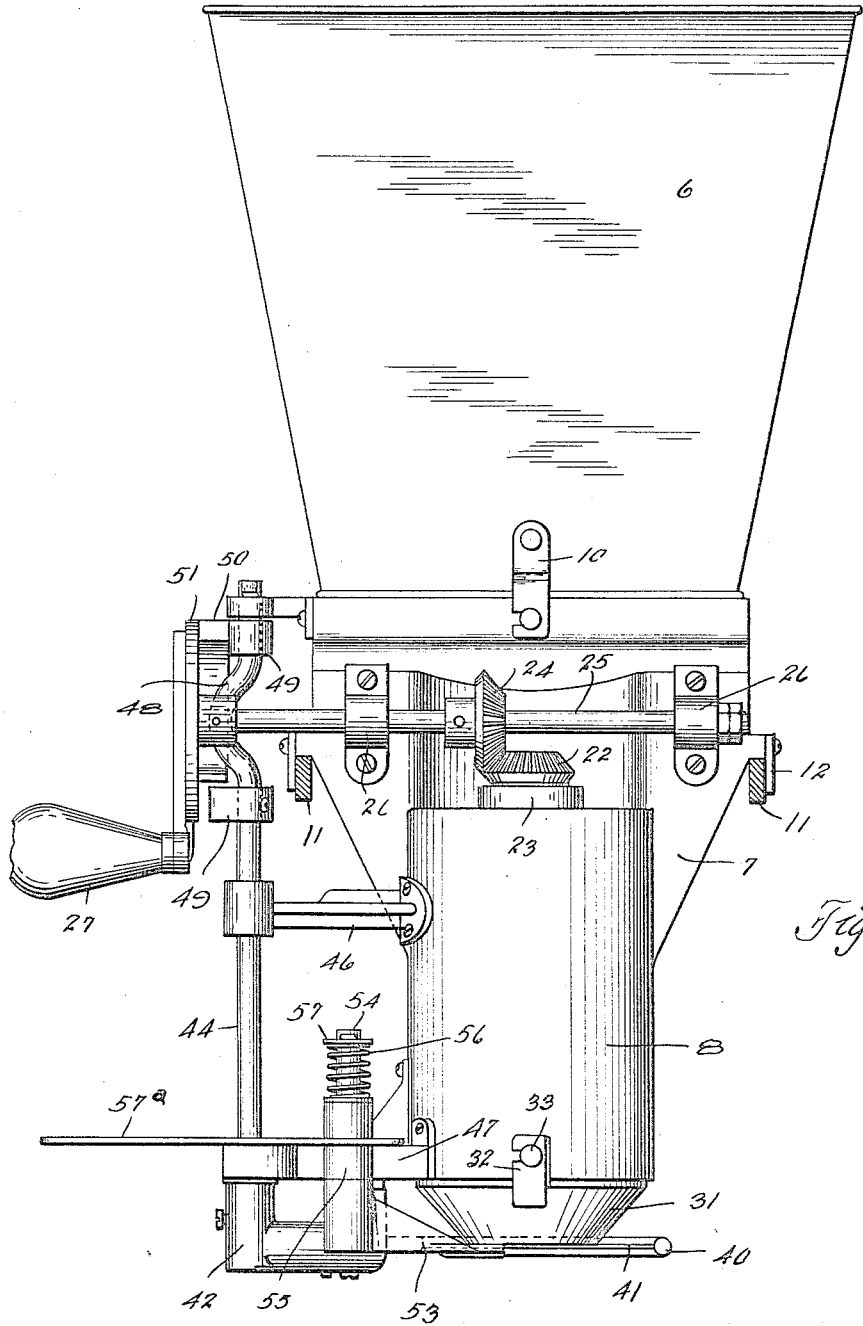
Fig. 3 is an end elevation of the machine.

Referring specifically to the drawings, 6 indicates a hopper mounted on a chute 7 which leads into the expressing cylinder 8. The hopper is removable, for cleaning or other purposes, and its lower end fits in the top of the chute 7 where it is held by pins 9 and a catch 10. The machine is supported on tracks or arms 11, the chute having side flanges 12 which confine it to the tracks, and it may be slid back and forth on the tracks by means of a handle 13 at the front. The tracks 11 are supported by a post 14, being pivoted to brackets thereon as indicated at 15, so that it may be swung around horizontally to different positions as shown in dotted lines in Fig. 2. By these means the machine may be moved either sidewise or in and out so as to drop the doughnuts at different places in a pan of hot grease, for example, (not shown) placed to receive the same. This is convenient for rapid operation of the machine.

The cylinder 8 contains a screw or worm consisting of an arbor or shaft 16 and the spiral blades 17, and the outer edge of the upper part, at least, of each blade is bent down or over as indicated at 18, forming a bead which acts to gather the dough from the chute 7 and draw it into the cylinder. I have found this much more satisfactory than a plain flat blade which permits the dough to slip or not feed into the cylinder. The upper end of the screw shaft has an axial stud 19 with a cross pin 20 adapted to engage in a slot 21 in a pinion 22 which turns in a bearing 23 in the top of the cylinder, and this pinion meshes with a bevel pinion 24 on a shaft 25 which is carried in bearings 26 on the side of the chute and is turned by a crank 27 at the end thereof.

To govern the amount of dough pressed out by the screw I employ a segment plate 28 (see Figs. 8 and 10). This plate is secured on a threaded axial stud 29 at the lower end of the shaft 16, by means of a nut 30, and the plate 28, by loosening the nut, can be turned to vary the size of the discharge spaces at the lower end of the screw, and thus vary the size or thickness of the strip of dough pressed out by the screw.

In the lower end or mouth of the cylinder 8 is a circular contracted mouthpiece or ring 31, held in position by lugs 32 which engage pins 33 on the outside of the cylinder 8, and at the center of this mouthpiece is a tapering core 34 which forms the hole in the doughnuts. This core 34 is supported by a pair of cross pins 35 which are located so far above the lower end of the mouthpiece that the dough, although divided by the pins, will unite again before it reaches the discharge.

The mouthpiece is contracted and the core is slightly expanded, toward the discharge opening, so that the dough is compressed into a solid tube as it is discharged. The core 34 also supports the screw, which rests thereon, so that the screw can be dropped out for cleaning, by removing the mouthpiece, the cross pin 20 disengaging from the slot 21.

Figure 4:
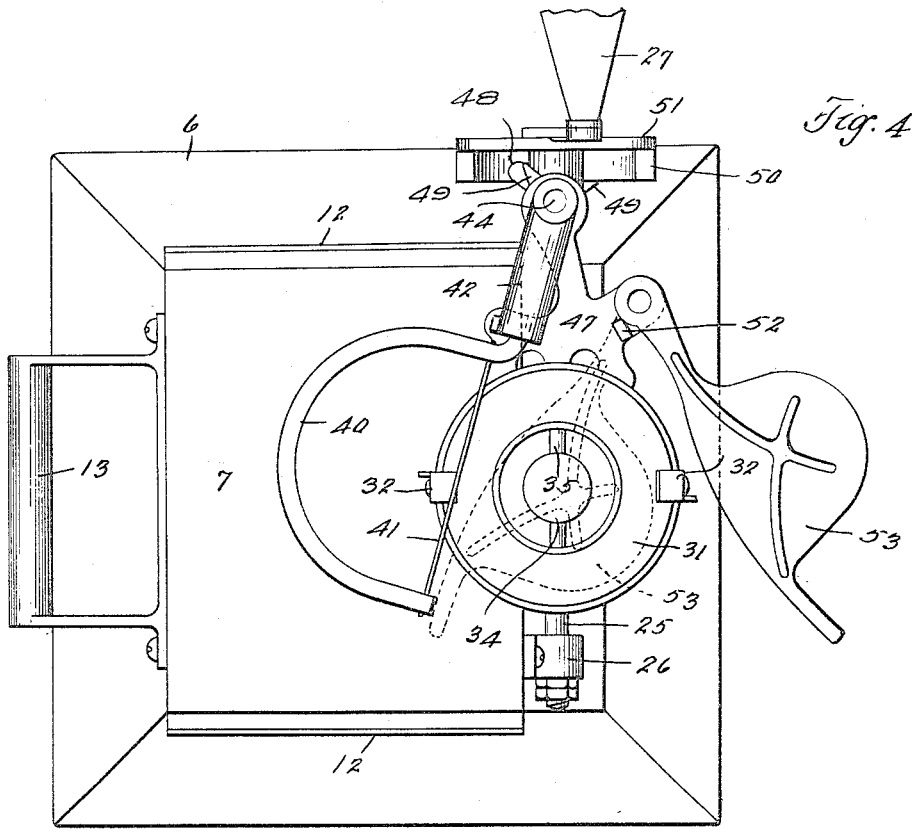
Fig. 4 is a bottom view with the cutter in one position.
Figure 7:
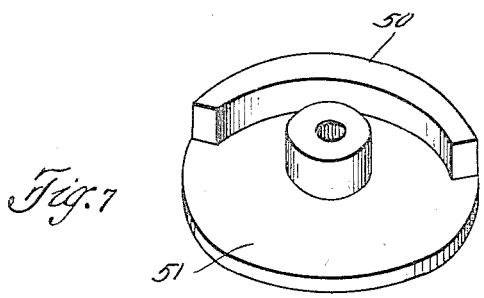
Fig. 7 is a detail of a cam for operating the cutter.
Figure 6:
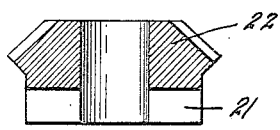
Fig. 6 is a detail of a gear.

For cutting off the doughnuts, as the dough is expressed from the cylinder, I employ a bowed frame 40 with a wire or blade 41 stretched across the same. The frame is held in a shank 42 (Fig. 11) by a screw 43, so that it can be renewed if broken. This shank 42 is pinned as indicated at 45 to the lower end of a rock shaft 44 which is supported by brackets 46 and 47 on the side of the cylinder. The upper end of this rock shaft is cranked as indicated at 48 around the shaft 25, and carries a pair of wipers 49 projecting at an angle to each other and adapted to be engaged intermittently by a cam 50 on the disk 51 secured to the drive shaft 25. By reason of the location of the wipers the stroke of the cutter is quick in each direction, with a dwell between each stroke. As the drive shaft is rotated the cam 50 strikes first one wiper 49 and then the other and rocks the shaft 44 accordingly, and this swings the cutter frame 40 and carries the cutter 41 back and forth across the mouthpiece, at each time cutting off a ring of the dough. Stops 52 limit the swing of the frame, these stops depending from the bracket 47. The different positions of the cutter are shown in Figs. 4 and 5.

For closing the mouth of the cylinder, as when the machine is not in use, I provide a swinging shield 53 pivoted at 54 to the bracket 47 and arranged to swing around under the mouthpiece. The pivot pin of this shield or closure extends through a housing 55 and is provided with a spring 56 confined under a washer 57 on the pivot, and the spring acts to hold the shield tightly against the mouthpiece. When the shield is swung around to closed position the spring will yield slightly to permit the shield to pass up the taper and under the mouthpiece, and acts to hold the same in close contact therewith until it is opened. When the machine is started the frame 40 will strike the shield and knock it open. 57ᵃ is a shield fastened to the cylinder 8 and located under the crank 27 to prevent the hand of the operator being burnt by grease splashing up from a pan into which the doughnuts are dropped.

In use the dough is placed in the hopper, and by turning the crank it is fed in a ring through the mouthpiece and cut off into doughnuts, and as stated above the machine can be shifted in and out on the tracks 11, or swung to the right or the left, to drop the doughnuts at different places.

I claim:

1. The combination with a dough-cutting and dropping machine, of a rigid swinging support on which the machine is slidably mounted, to permit the cuttings to be dropped at different places.

2. The combination with a dough-cutting and dropping machine, of a track on which the machine is slidably mounted, to drop the cuttings at different places, said track being pivoted at one end thereof, to swing horizontally.

3. The combination with a dough-cutting and dropping machine, of a swinging track comprising a pair of rigid bars between which the machine is mounted, and a single pivotal support for said bars.

In testimony whereof, I do affix my signature in presence of two witnesses.

PERCY J. WIXEY.

Witnesses:
JOHN A. BOMMHARDT,
GEORGE W. HEENE.